United States Patent [19]
Eisdorfer et al.

[11] Patent Number: 5,960,348
[45] Date of Patent: *Sep. 28, 1999

[54] TECHNIQUE FOR USE IN PROCESSING TELEPHONE CALLS

[75] Inventors: Allen Eisdorfer, Woodbridge; Jerry Eisdorfer, Somerset; Mark Jeffrey Foladare, Kendall Park; Shelley B. Goldman, East Brunswick; Nancy Murray, Morris Township, Morris County; David Phillip Silverman, Somerville, all of N.J.

[73] Assignee: AT&T Corp, New York, N.Y.

[ * ] Notice: This patent is subject to a terminal disclaimer.

[21] Appl. No.: 08/854,381

[22] Filed: May 12, 1997

Related U.S. Application Data

[63] Continuation of application No. 08/690,603, Jul. 31, 1996, abandoned, which is a continuation of application No. 08/346,655, Nov. 30, 1994, abandoned.

[51] Int. Cl.[6] ...................................................... H04Q 7/38
[52] U.S. Cl. .......................... 455/445; 455/417; 379/211; 379/221
[58] Field of Search ..................................... 455/403, 414, 455/417, 422, 445, 435, 461, 567, 560; 379/210–213, 221, 219, 220

[56] References Cited

U.S. PATENT DOCUMENTS

| | | | |
|---|---|---|---|
| 4,748,655 | 5/1988 | Thrower et al. | 379/60 |
| 5,473,671 | 12/1995 | Partridge, III | 455/445 |
| 5,627,875 | 5/1997 | Kapsales | 379/221 X |
| 5,706,339 | 1/1998 | Eisdorfer et al. | 379/211 |
| 5,794,143 | 8/1998 | McCarthy et al. | 455/422 |

FOREIGN PATENT DOCUMENTS 2193861  2/1988  United Kingdom  ..................... 379/59

OTHER PUBLICATIONS

Michael Hientz et al., "The Short Message Service—A New Service of Digital Mobile Communication", pp. 517–526, Sep. 1993.

*Primary Examiner*—Dwayne D. Bost
*Assistant Examiner*—William G. Trost

[57] ABSTRACT a telecommunications carrier other than the carrier of last contact is arranged to a) recognize that the telephone to which a particular call is placed is a disconnected telephone and b) provide different call treatment for the call, e.g., different call handling or different call features or services, as compared to the treatment the telecommunications carrier provides for the same call to the same telephone when it is recognized that the telephone is not disconnected. Advantageously, no effort is wasted in an attempt to complete the telephone call to a disconnected telephone. Such different treatments include 1) simply making no attempt to route the call to the disconnected telephone via the network of last contact, 2) routing the call to a secondary, alternate telephone, and 3) initiating transmission of a page to a pager that is associated with the owner of the disconnected telephone.

14 Claims, 3 Drawing Sheets

TECHNIQUE FOR USE IN PROCESSING TELEPHONE CALLS

This application is a continuation of application Ser. No. 08/690,603, filed on Jul. 31, 1996, now abandoned, which is a continuation of application Ser. No. 08/346,655 filed on Nov. 30, 1994, now abandoned.

TECHNICAL FIELD

This invention relates to the processing of a telephone calls to particular types of telephones, such as wireless telephones.

BACKGROUND OF THE INVENTION

In the United States, while some telephone calls are handled by one service provider, e.g., a local call completed between wired (as opposed to wireless) telephone stations, many calls, e.g., long-distance calls, require multiple service providers to cooperate for their completion. The initial carrier providing telephone service is typically a local service provider, illustratively a local exchange carrier (LEC), such as New Jersey Bell. However, the term "local service providers", as used herein, also includes cellular (wireless), cable and any so-called "dial-tone" or "first contact service" provider. Such local service providers are also, typically, the network of last contact for a call, because they are connected to the called subscriber where the call exits the public network. Thus, in other words, for a particular call, the network of first contact and the network of last contact are those networks that are directly connected to the telephones of the caller and called party, respectively.

The network connecting the network of first contact with the network of last contact is typically, but not necessarily, that of a long-distance--or so-called interexchange (IXC)—telephone carrier. In the United States, AT&T, MCI and Sprint are three such IXCs. For example, presently, for a long-distance telephone call between wired telephone subscribers, the local service providers serving the calling and called telephones are two different LECs which are interconnected by a long-distance, or interexchange, carrier.

In some call scenarios, there are only two networks connected together, the network of first contact and the network of last contact. For example, for a local call from a wired telephone to a wireless telephone station within the same area code, the network of first contact is a LEC connected to the calling party at the wired telephone station while the network of last contact is a cellular service provider connected via a radio link to the telephone of the called party, both networks being those of local service providers. Thus, it is possible for a telecommunications carrier to serve multiple roles.

SUMMARY OF THE INVENTION

We have recognized that there is a category of telephones, which we call "disconnected telephones", that are 1) unreachable for any communication by any network of last contact, e.g., they have been turned off in a manner that disconnects them from any communications link to the telephone system, and 2) the telephone system can detect that the telephone has become unreachable. Exemplary disconnected telephones include a) wireless telephones that have been turned off, i.e., they are not in a low-power standby mode, and b) a video telephone that is connected to a cable network but has been turned off. Typically such disconnected telephones are directly addressable, i.e., communication with such a telephone is not dependent upon the telephone having a particular connection, e.g., being connected to a particular telephone line—as with conventional wired telephones—, but instead communication depends upon a unique address contained within the telephone itself, so that the telephone can be freely moved without changing its address.

As they are unreachable for any communication, calls placed to such disconnected telephones cannot be completed. However, according to the prior art, calls to disconnected telephones had to be routed to the network of last contact that serves the disconnected telephone before it could be known that the called telephone was disconnected, because only the network of last contact knew, or was able to ascertain, the status of the called telephones. Such an arrangement is inefficient and may result in costs being incurred by service providers carrying the call that are not the last contact service provider.

Therefore, to avoid such costs, in accordance with the principles of the invention, a telecommunications carrier other than the carrier of last contact is arranged to a) recognize that the telephone to which a particular call is placed is a disconnected telephone and b) provide different call treatment for the call, e.g., different call handling or different call features or services, as compared to the treatment the telecommunications carrier provides for the same call to the same telephone when it is recognized that the telephone is not disconnected. Advantageously, no effort is wasted in an attempt to complete the telephone call to a disconnected telephone. In an exemplary embodiment of the invention, one such different treatment is to simply make no attempt to route the call to the disconnected telephone to the network of last contact. In another exemplary embodiment of the invention, according to one such different treatment, a call placed to a disconnected telephone is routed to a secondary, alternate telephone. In yet another exemplary embodiment of the invention, transmission of a page to a pager that is associated with the owner of the disconnected telephone is initiated.

DETAILED DESCRIPTION

Figure 2:
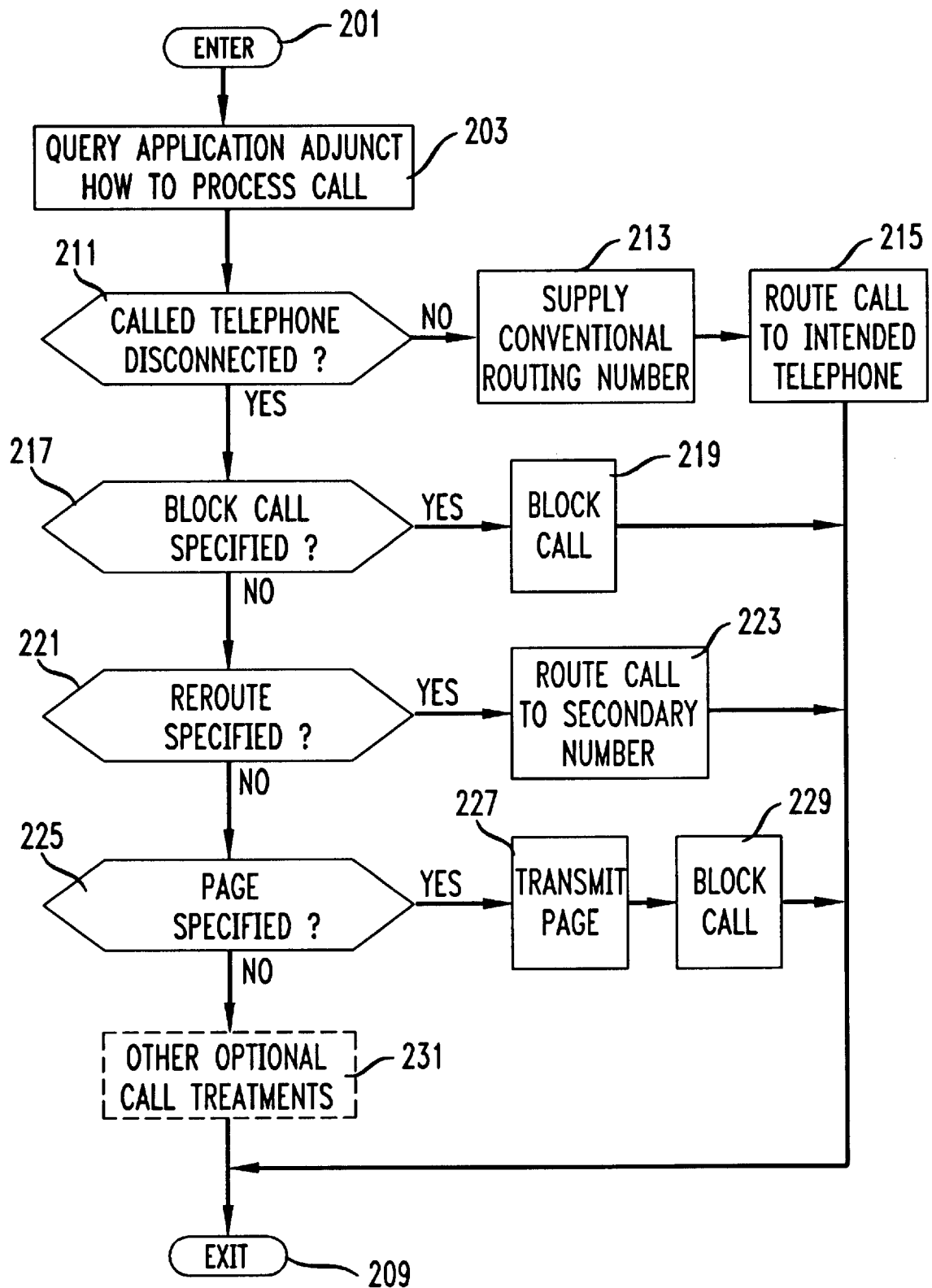
FIG. 2 shows a flowchart of an exemplary method for processing telephone calls in accordance with the principles of the invention in which a telecommunications carrier other than the carrier of last contact is arranged to a) recognize that the telephone to which a particular call is placed is a disconnected telephone and b) provide different call treatment for the call, e.g., different call handling or different call features or services, as compared to the treatment the telecommunications carrier provides for the same call to the same telephone when it is recognized that the telephone is not disconnected.

FIG. 2 shows a flowchart of an exemplary method for processing telephone calls in accordance with the principles of the invention in which a telecommunications carrier other than the carrier of last contact is arranged to a) recognize that the telephone to which a particular call is placed is a disconnected telephone and b) provide different call treatment for the call, e.g., different call handling or different call features or services, as compared to the treatment the telecommunications carrier provides for the same call to the same telephone when it is recognized that the telephone is not disconnected. Thus, advantageously, no attempt is made to complete the telephone call to a disconnected telephone. It is noted that "disconnected telephones", are telephones that are 1) unreachable for any communication by any network of last contact, e.g., they have been turned off in a manner that disconnects them from any communications link to the telephone system, and 2) the telephone system can detect that the telephone has become unreachable. Typically such disconnected telephones are directly addressable, i.e., communication with such a telephone is not dependent upon the telephone having a particular connection, e.g., being connected to a particular telephone line—as with conventional wired telephones—, but instead communication depends upon a unique address contained within the telephone itself, so that the telephone can be freely moved without changing its address.

Disconnected telephones are typically only temporarily unreachable for any communication by any network of last contact. Conventional exemplary disconnected telephones include wireless telephones that have been turned off, i.e., they are not in a low-power standby mode. Thus, for example, a car telephone may become disconnected when a driver reaches his destination and turns off the car. Similarly, a portable wireless telephone that is being carried by a person may become disconnected when the batteries of the portable wireless telephone weaken so that they are unable to power it any longer. Another exemplary type of disconnected telephone, is a video telephone that is connected to a cable network but has been turned off.

Figure 1:
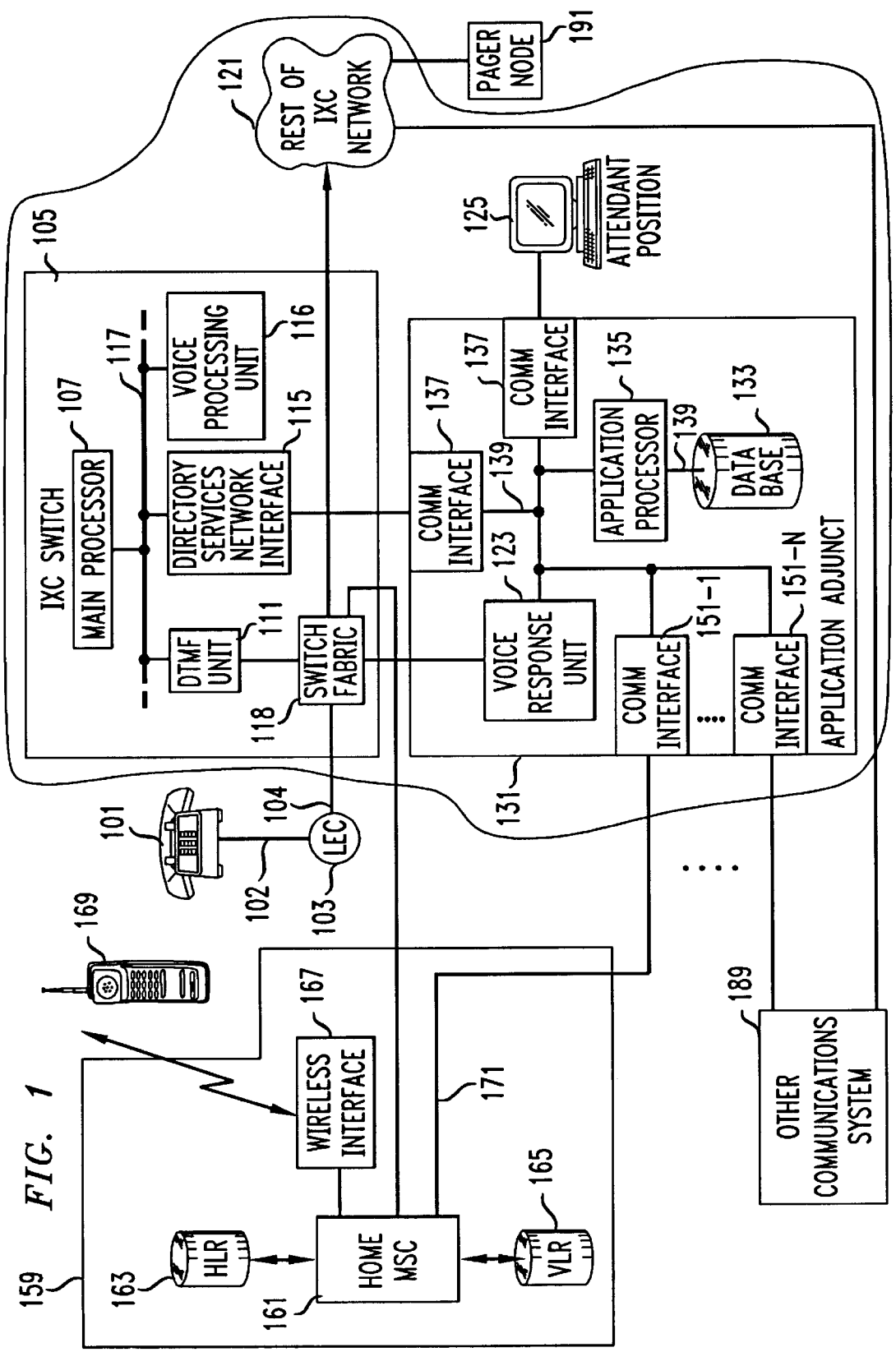
FIG. 1 shows an entire exemplary telecommunications system, including a telecommunications network other than that of the carrier of last contact, arranged in accordance with the principles of the invention.

Attention is first directed to FIG. 1, which shows an entire exemplary telecommunications system, including a telecommunications network other than that of the carrier of last contact, arranged in accordance with the principles of the invention. The exemplary telecommunications system includes a) telephone station 101, from which calls to a personal telephone number may be originated or received, b) telephone line 102 of telephone station 101, which is provisioned with the well known call waiting feature, c) local exchange carrier (LEC) 103, d) IXC switch 105, e) the rest of IXC network 121, f) application adjunct 131, g) attendant position 125, h) wireless communication system 159, i) other communications system 189 and j) pager node 191.

Application adjunct 131 performs the necessary processing for 1) determining if a telephone to which a call is placed is a disconnected telephone and 2) if so, providing a different call treatment for the call. Application adjunct 131 includes: a) application processor 135, b) data base 133, c) voice response unit 123, and d) communication interfaces 137. Application processor 135 controls the overall operation of application adjunct 131 by performing any necessary processing and exchanging messages with the other components of application adjunct 131 over links 139. Links 139 convey information in digital form and need not all be of the same type or speed, e.g., one may be an Ethernet link while the others are RS-232C links. Data base 133 stores the information required by application processor 135 to control application adjunct 131, e.g., program code and data.

Voice response unit 123 can make various announcements which can be heard by the calling party. The information necessary for making the announcements, or combinative portions thereof, may be prestored in voice response unit 123. In one embodiment, the announcements are accessed by supplying voice response unit 123 with pointers to them. Voice response unit 123 is connected to switch fabric 118 so that the announcements may be routed to subscribers connected to application adjunct 131.

Communication interfaces 137 translate information for communication between application adjunct 131 and devices external to application adjunct 131, which may be part of separate communications networks. Communication interfaces 137 need not be the same. Attendant position 125, staffed by a human attendant, interfaces with application adjunct 131 to handle any questions that a subscriber may have or any problems that may arise.

Communication interfaces 151, including communications interfaces 151-1 through 151-N translate information for communication between application adjunct 131 and communications systems external to application adjunct 131, which may be belong to separate communications carriers. Communication interfaces 151 need not be the same. Each external communication system contains corresponding communication interfaces (not shown for simplicity).

IXC switch 105 includes: a) main processor 107, b) dual tone multi-frequency receiver (DTMF REC) 111, c) directory services network interface 115, d) bus 117, e) switch fabric 118, and f) optional voice processing unit 116. Main processor 107 controls the overall operation of IXC switch 105 by performing any necessary processing and exchanging messages with the other components of IXC switch 105 over bus 117. Dual tone multi-frequency unit (DTMF unit) 111 a) receives dual tone multi-frequency signals that are transmitted in response to the pressing of keys on the keypad of telephone station 101 and supplies the digit corresponding to each pressed key to main processor 107 and b) generates dual tone multi-frequency signals in response to commands from main processor 107. IXC switch 105 receives the caller's ANI from LEC 103 in the conventional manner.

Directory services network interface 115 is a protocol conversion unit that permits IXC switch 105 to communicate with application adjunct 131. It is responsible for formatting all messages transmitted to and for extracting responses received from application adjunct 131. Such messages include a) a message from IXC switch 105 indicating the ANI of the calling telephone. In one embodiment, the link between directory services network interface 115 and application adjunct 131 uses the well known X.25 protocol.

Switch fabric 118 can connect the trunk on which the subscriber's call arrived at IXC switch 105, e.g., trunk 104, to a) dual tone multi-frequency unit (DTMF unit) 111, b) voice recognition unit 116, c) voice processing unit 123, d) other communications carriers terminated thereat, e.g., wireless communications system 159, or e) to the rest of the interexchange carrier's network, 121. Some of the purposes of such connections are described further below.

Also shown in FIG. 1 is exemplary wireless communication system 159 of a mobile carrier. Exemplary wireless communication system 159 includes a) home mobile switching center (MSC) 161, b) home location register (HLR) data base 163, c) visitor location register (VLR) data base 165, and d) wireless interface 167. Mobile telephone 169 is shown as being presently connectable to wireless communication system 159. Home mobile switching center (MSC) 161 is a switch for providing wireless telephone service to the subscribers of the mobile carrier that owns home mobile switching center (MSC) 161 as well as subscribers of other mobile carriers that are visiting, also known as "roaming" in, the area served by home mobile switching center (MSC) 161. Home mobile switching center (MSC) 161 is connected to switch fabric 118 so that calls may be routed from IXC switch 105 to wireless subscribers. For the purpose of keeping track of the active subscribers presently being served by mobile switching center (MSC) 161, home mobile switching center (MSC) 161 is connected to 1) home location register (HLR) data base 163, 2) visitor location register (VLR) data base 165, and 3) wireless interface 167.

Home location register (HLR) data base 163 contains a list of the subscribers of the mobile carrier that owns home mobile switching center (MSC) 161 and have home mobile switching center (MSC) 161 as their "home" mobile switch, i.e., the list of subscribers that are not roaming when they are served by home mobile switching center (MSC) 161. Such subscribers are called "home subscribers". Home location register (HLR) data base 163 is used for routing of calls by keeping track of the current location of, e.g., the mobile switching system presently or last known to have been serving, each "home subscriber". To this end, for example, home location register (HLR) data base 163 maintains a pointer to the current location of each home subscriber. The pointer contains a system address of the mobile switching center (MSC) that is presently, or was last known to have been, serving that home subscriber.

Visitor location register (VLR) data base 165 contains a list of each subscriber presently being or was last known to have been served by home mobile switching center (MSC) 161, whether they are a home subscriber or a roaming subscriber. Visitor location register (VLR) data base 165 also contains status information indicating whether each subscribers presently being served by home mobile switching center (MSC) 161 is connected or disconnected. Thus, it is noted, that subscribers are always considered to be a "visitor", even when they are served by their home mobile switching center (MSC).

Wireless interface 167 provides the wireless connection, e.g., cellular radio connection, between home mobile switching center (MSC) 161 and a wireless personal communication device, e.g., wireless telephone 169.

Returning attention to FIG. 2, shown is a flowchart of an exemplary process for providing telecommunication services in accordance with the principles of the invention. Prior to step 201, but part of the overall process of completing a telephone call to a telephone that may be a disconnected telephone, when a call is placed to such an identifiable telephone number, e.g., by a calling party originating a call at a telephone station 101 (FIG. 1), a switch of local exchange carrier (LEC) 103 receives the dialed digits and, from their unique characteristics, recognizes that the call is a call that must be routed through another carrier. Local exchange carrier (LEC) 103 then routes the call over a trunk, e.g., trunk 104, to switch 105 of an interexchange carrier for further handling as per the process shown in FIG. 2.

The process is entered in step 201 when IXC switch 105 recognizes that the call that was routed to it for completion is being placed to a telephone number that may correspond to a disconnected telephone. This is possible because such telephone numbers have certain unique characteristics that allow them to be differentiated from conventional telephone numbers. For example, the called telephone number may have a unique exchange number within each area code. Thus, for conventional telephone numbers of the North American Numbering Plan, the numbers of which are of the form NPA-NXX-XXXX, where NPA is the area code, NXX is the central office exchange, and XXXX is the particular unit designation, to identify a telephone number that correspond to a disconnectable telephone only the six digit positions of the NPA and NXX need be examined. As another example, the telephone number dialed is a translatable telephone number for which the routing telephone number may similarly be identified to correspond to a disconnectable telephone. Alternatively, the process may be performed for every telephone call.

In step 203, IXC switch 105 queries application adjunct 131, via directory services network interface 115 and communications interface 137, as to how to handle the call to the called telephone. To this end, the query includes at least an indication of the telephone number to which the call was placed, and, optionally, the telephone number of the calling party, e.g., for use in paging.

Thereafter, in accordance with the principles of the invention, conditional branch point 211 tests to determine if the called telephone number is that of a disconnected telephone. This test may be performed by checking the status column of Table 1, which is stored in database 133, to determine if the status of the called telephone in table is listed as "Disconnected". If the test result in step 211 is NO, indicating that the value stored for the telephone number in the status column of Table 1 is "Connected", control passes to step 213, in which application adjunct 131 supplies a routing telephone number to IXC switch 105 for the dialed telephone number. The routing telephone number may be different from the dialed telephone number, e.g., the dialed telephone number is a translatable telephone number, such as an 800-type telephone number. IXC switch 105 routes the call to the telephone number it receives from application adjunct 131, in step 215 so that the call is completed in the conventional manner. The process then exits in step 209.

TABLE 1

| Telephone Number | Status | Routing Number | Alternate Treatment | Secondary Number |
|---|---|---|---|---|
| 5559742211 | Connected | 5559742211 | Block | |
| 5559497777 | Connected | 5559497777 | Reroute | 5558675309 |
| 5559492211 | Connected | 5559492211 | Block | |
| 5554152219 | Disconnected | 5554152219 | Block | |
| 8005558100 | Connected | 4979991213 | Reroute | 9998776654 |
| 8005554444 | Connected | 4979982345 | Block | |
| 8005552312 | Disconnected | 6989876543 | Page | 5559998888S1234 |
| 2213861599 | Connected | 2213861599 | Block | |
| 8334429181 | Disconnected | 8334429181 | Page | 9998886676S9876 |
| 5009998828 | Connected | 5009998828 | Block | |

In accordance with the principles of the invention, if the test result in step 211 is YES, indicating that the value stored for the telephone number in the status column of Table 1 is "Disconnected", and thus, if completed in the conventional manner the call will be routed to a disconnected telephone, control passes to step 223 to begin, in accordance with an aspect of the invention, that portion of the process in which the particular alternate call treatment to be given to the call is determined. Advantageously, by providing an alternate call treatment, no time or expense is wasted attempting to complete the call to a disconnected telephone.

Conditional branch point 217 tests to determine if the specified alternate call treatment is to block the call. If the test result in step 217 is YES, control passes to step 219, and the call is blocked by IXC switch 105. An announcement may be played to the caller as part of the blocking of the call, e.g. by voice processing unit 116. Control then passes to step 209 and the process is exited.

If the test result in step 219 is NO, control passes to conditional branch point 221, which tests to determine if rerouting the call to a secondary number is specified as the alternate treatment. If the test result in step 221 is YES, control passes to step 223, and the call is routed to a secondary number that is stored for the dialed telephone number in Table 1. Application adjunct 131 supplies this secondary telephone number to IXC switch 105 as the routing telephone number. Control then passes to step 209 and the process is exited.

If the test result in step 221 is NO, control passes to conditional branch point 225, which tests to determine if paging is specified as the alternate treatment. If the test result in step 225 is YES, control passes to step 227, in which a page is transmitted to a pager associated with the called telephone. Such a page may be transmitted by, for example, establishing a connection from DTMF unit 111 to pager node 191 via switch fabric 111 and rest of IXC network 121 and having DTMF unit 111 transmit the appropriate signals to pager node 191. Note that Table 1 stores paging information in the secondary number field, which may include a) a telephone number to access the pager node, e.g., pager node 191; b) a spacer, "S", indicating that a predetermined amount of time should be waited; and c) a code identifying the associated pager, which may be signaled as dual tone multi-frequency signals by DTMF unit 111. The ANI of the calling telephone may also supplied to the pager node, so that the called party can known who was calling him. Next, in step 229, the call is blocked. Again, as part of blocking the call an announcement may be played to the caller. Control then passes to step 209 and the process is exited.

If the test results in step 225 is NO, control passes to step 231 in which any other, optional, call treatments desired by the implementor may be executed. Control then passes to step 209 and the process is exited.

There are three exemplary processes by which it may be determined by application adjunct 131 if a telephone number corresponds to a disconnected telephone.

In the first method, each time the status of a wireless telephone changes, home mobile switching center (MSC) 161 transmits a message via link 171 to communications interface 151-1 indicating the wireless telephone's telephone number and its new status. Application adjunct 131 can then update the information stored in the status column of Table 1 for that telephone number or, for that routing number if the telephone number is a translatable telephone number.

Figure 3:
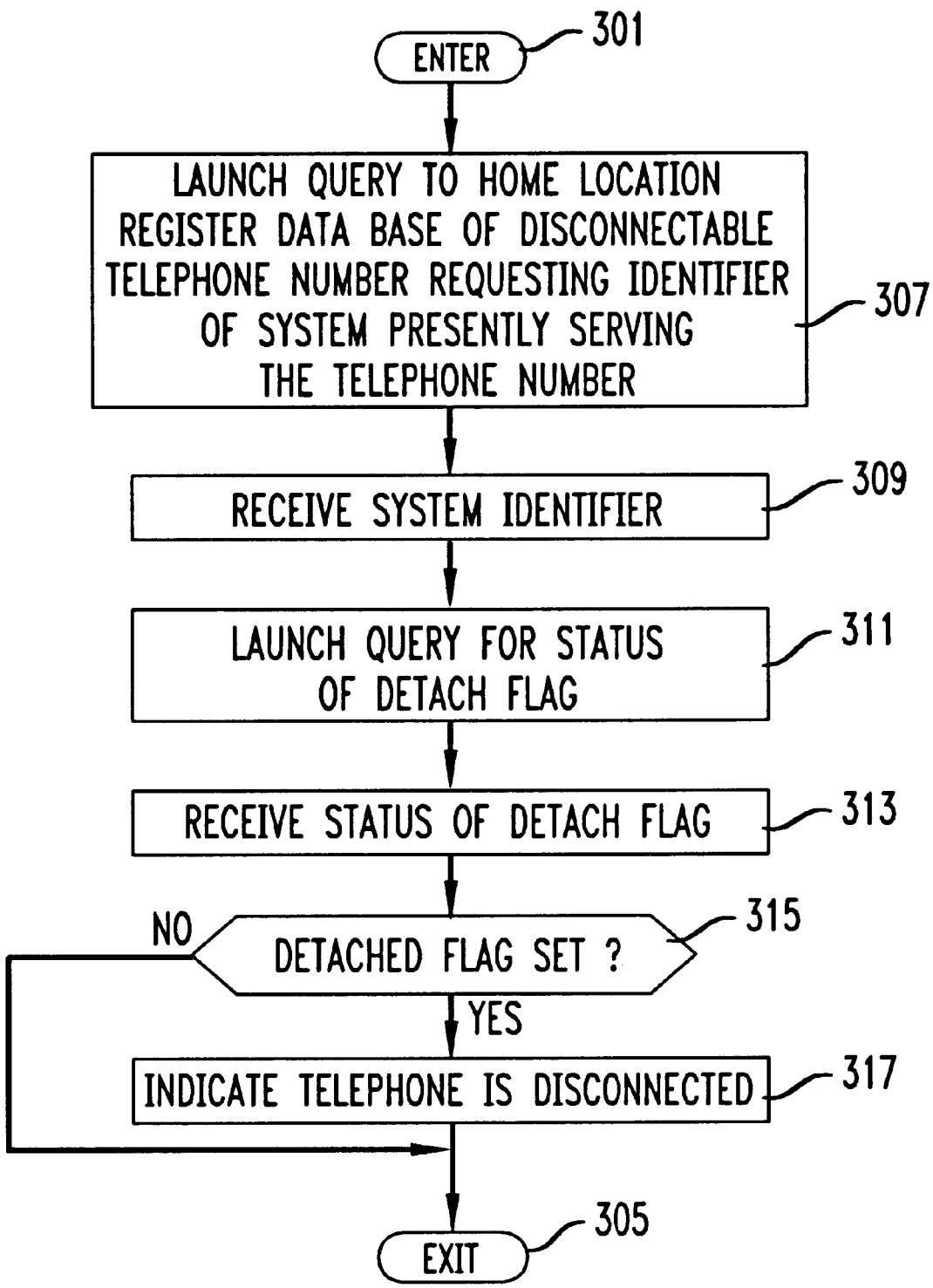
FIG. 3 shows a method for determining if a telephone number corresponds to a disconnected telephone.

A second method by which application adjunct 131 determines if a telephone number corresponds to a disconnected telephone is shown in FIG. 3. The process shown in FIG. 3 is suitable for use with wireless telephones. The process shown in FIG. 3 is entered in step 301, which is executed after step 203 of the process shown in FIG. 2 and is completed prior to the execution of step 211 of the process shown in FIG. 2. Control passes to step 307, in which, based on the routing telephone number, application adjunct 131 launches a query over the appropriate one of communication interfaces 151 to the home location register data base of the home mobile switching center of the wireless telephone identified by the routing number for the dialed telephone number. The query requests the identifier of the mobile switching center that presently is serving, or was last known to be serving, the wireless telephone, and therefore contains its visitor location record. In step 309, application adjunct 131 receives the requested identifier from the mobile switching center.

Next, in step 311, application adjunct 131 launches a query to the visitor location register data base of the identified mobile switching center requesting the status of the "detach" flag for the routing telephone number. The detach flag is a conventionally available flag that indicates when set that the wireless telephone is disconnected and when clear that the wireless telephone is connected and available for calls. The detach flag is maintained in the visitor location register data base of the mobile switching center that is presently providing service to the wireless telephone or was the last mobile switching center to have provided service prior to the wireless telephone becoming disconnected. In step 313, a response is received at application adjunct 131.

Conditional branch point 315 tests to determine if the detach flag is set. If the test result in step 315 is NO, indicating that the detached flag is clear and that the wireless telephone is connected and available for calls, control passes to step 305 and the process is exited. If the test result in step 315 is YES, indicating that the detached flag is set and that the wireless telephone is disconnected, control passes to step 317 in which, in accordance with an aspect of the invention, a "Disconnected" entry is made in the status column of Table 1 for the wireless telephone, thus indicating that the wireless telephone is a disconnected telephone that is to be skipped over at step 211 during the processing the quick sequence. The process then exits in step 305.

A third method by which application adjunct 131 determines if a telephone number corresponds to a disconnected telephone is the use of periodic polling. Such periodic polling is suitable for wireless telephones as well as for cable system based videophones. To employ polling, it is known in advance that, as noted above, certain telephone numbers correspond to telephones that may be disconnected. According to the periodic polling method, application adjunct 131 periodically launches a query for each routing telephone number which corresponds to a telephone that may be disconnected from the communication system to which the telephone is presently, or was last, connected, requesting the status of the telephone. How such status information is communicated for wireless telephones was described above in conjunction with FIG. 3. The status information in Table 1 is updated in accordance with the response to the query.

For cable based communication systems, similar queries are launched to the cable system serving the specified telephone number. Those skilled in the art of cable communication will be able to implement systems for determining the status of telephones connected to the cable system.

It is noted that calls may also be routed from IXC switch 105 to home mobile switching center (MSC) 161 indirectly via the rest of IXC network. It is also noted that a LEC may be interposed between the IXC and the MSC.

In other embodiments of the invention, telephone numbers and/or ANI may be replaced with other indications that represent the destination to which a call is to be routed. Also, in other embodiments of the invention, the information indicating the status of a telephone as being disconnected or not may be stored in the same data base as the information for implementing the quick sequences.

The techniques described herein are also applicable to the emerging technology of two-way pagers, which are telecommunication devices that may become disconnected.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method for use in completing a telecommunication connection in an environment in which a called telecommunications device is presently served by a first local network or was last served by said first local network if said called telecommunications device is a disconnected telecommunications device, the method comprising the steps of:

receiving at a first interexchange carrier network, a call originating for a second local network;

determining in the first interexchange carrier network whether or not the called telecommunications device is disconnected by referring to a memory in the first interexchange carrier network, wherein said determining is performed in advance of an attempt to complete the telecommunications connection;

giving said telecommunications connection a first treatment in the first interexchange carrier network if the result of said determining step is that the called telecommunications device is not disconnected; and in the first interexchange carrier network, giving said telecommunication connection a second treatment, different from said first treatment, if the result of said determining step is that the called telecommunications device is disconnected.

2. A method for use in completing a telephone call in a calling environment in which a called telephone is presently served by a first local network or was last served by said first local network if said called telephone is a disconnected telephone, the method comprising the steps of:

determining in a first interexchange carrier network whether or not the called telephone for said telephone call is a disconnected telephone by referring to a memory in the first interexchange carrier network, wherein said determining is performed in advance of an attempt to complete the telecommunications connection;

giving said telephone call a first call treatment in the network of said service provider other than said local service provider if the result of said determining step is that the called telephone is not a disconnected telephone; and in the network of said service provider other than said local service provider, giving said telephone call a second call treatment, different from said first call treatment, if the result of said determining step is that the called telephone is a disconnected telephone.

3. The invention as defined in claim 2 wherein the called telephone is a wireless telephone that has been turned off.

4. The invention as defined in claim 2 wherein the called telephone is a telephone that has been disconnected from a cable network.

5. The invention as defined in claim 2 wherein said second call treatment is the routing of said telephone call to a non-disconnectable telephone.

6. The invention as defined in claim 2 wherein said second call treatment is the blocking of said telephone call.

7. The invention as defined in claim 2 wherein said second call treatment is the initiation of a page to a predefined pager.

8. The invention as defined in claim 2 wherein the called telephone is indicated by the primary routing telephone number that corresponds to a translatable telephone number.

9. The invention as defined in claim 2 wherein said method includes the step of receiving a signal in the first interexchange carrier network from said first local network indicating whether or not the called telephone is a disconnected telephone.

10. The invention as defined in claim 9 further including the step of storing in the first interexchange carrier network an indication that the called telephone is a disconnected telephone, said storing being performed in response to said received signal.

11. The invention as defined in claim 9 further including the step of transmitting, from the first interexchange carrier network to said first local network, a request for information indicating whether or not the called telephone is a disconnected telephone and wherein said signal is received in response to said transmitted request.

12. The invention as defined in 11 wherein said requests are transmitted periodically.

13. The invention as defined in claim 11 further including the step of transmitting a query from the first interexchange carrier network to a network of a home telephone system of said called telephone requesting information identifying the first local network, the network of said home telephone system being connected to the first interexchange carrier network.

14. The invention as defined in claim 13 wherein said home telephone system is said network of said local telephone system.

* * * * *